United States Patent Office 3,019,273
Patented Jan. 30, 1962

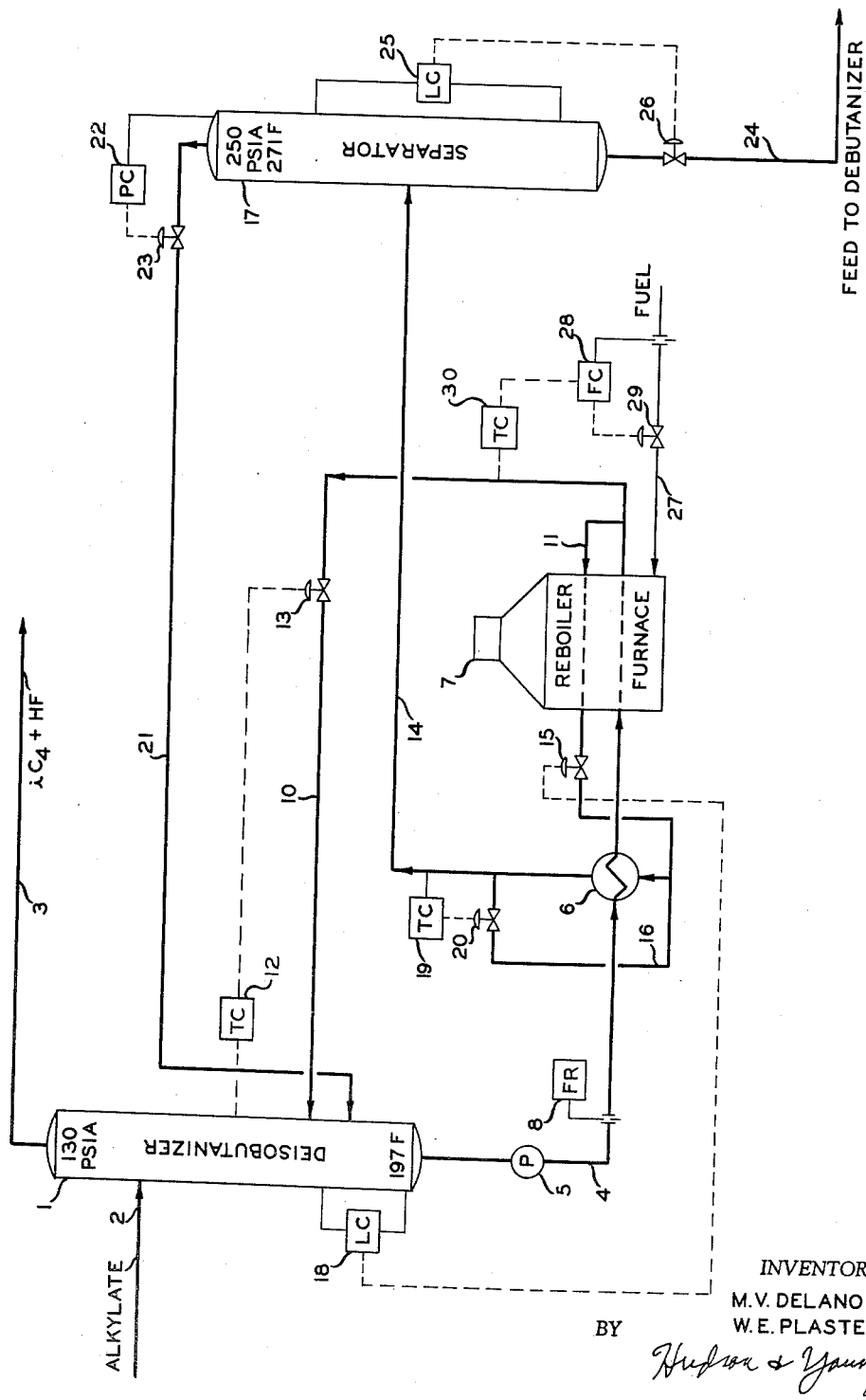

3,019,273
DEFLUORINATION OF HF ALKYLATE
Merritt V. De Lano, Jr., and William E. Plaster, Bartlesville, Okla., assignors to Phillips Petroleum Company, a corporation of Delaware
Filed Dec. 11, 1958, Ser. No. 779,752
10 Claims. (Cl. 260—683.42)

This invention relates to hydrocarbons which have been alkylated in presence of a fluorine-containing catalyst. In one of its aspects, this invention relates to defluorination of HF alkylate.

It is known in the art to upgrade isoparaffin for use in internal combustion engines by reacting the isoparaffin with an olefin in the presence of a fluorine containing catalyst such as hydrogen fluoride. Similarly aromatic hydrocarbons can be alkylated with olefins with fluorine containing catalyst. The olefin stream to the alkylation unit generally includes normal paraffins which act as a diluent and also as an isomerization equilibrium control. For example, during the alkylation step there is a tendency of the paraffins to isomerize and if pure isoparaffins are used, some of the material is lost due to isomerization to the normal paraffins. These normal paraffins are usually associated with the olefin and enter the reactor therewith. The alkylate from such an alkylation zone contains some fluorine, probably as organic fluorides, which should be removed since these compounds are detrimental in an internal combustion engine and are undesirable in the exhaust gas from same. The alkylate passes to a fractionator where unreacted isoparaffins are removed and the alkylate and normal paraffins along with the organic fluorides are removed as bottoms. This bottoms product must be heated to at least 400° F. to break down the fluorides. Since isooctane is the desired product the paraffin generally employed is isobutane and the olefin is a butylene. It is known to the art that other products will also be obtained, however, a large percentage of the product is iso-octane. For that reason, the invention and prior art will be discussed in relation to alkylation of isobutane with butylenes.

In the prior art, the deisobutanizer is operated by taking a portion of the bottoms, heating same, and returning the heated material to the kettle of the column. In order to remove the fluorine present the deisobutanizer reboiler outlet is heated to 400° F. and this heated material returned to the tower kettle where the HF vapors go up the tower and are removed. Since the amount of heat (and therefore the circulation rate through the reboiler) is fixed by the boil-up rate of the tower, the percentage of the bottoms product that passes through the reboiler, and is thereby defluorinated, is limited. Since the remaining bottoms is product, this must then still contain some fluorides. The circulation rate is even more limited when there are large quantities of n-butane present in the deisobutanizer bottoms, e.g. 10% or over, and it becomes impossible to keep the 400° F. reboiler outlet material from being almost all or entirely in the vapor state.

It is an object of this invention to provide a novel method of defluorinating an alkylate containing fluorine associated therewith in the form of organic fluorides.

Another object of this invention is to provide a method of defluorinating a mixture of hydrocarbons comprising isoparaffns and a large amount of normal paraffins.

Still other objects, features and advantages of this invention will be obvious to those skilled in the art having been given this disclosure.

According to this invention, the above objects are accomplished by heating all the reboiler product to a temperature required for the kettle, returning a major portion to the kettle, heating the remaining portion of this stream to at least 400° F. to release fluorine as HF, and separating fluorine free hydrocarbon from HF containing gas.

The paraffins which are to be alkylated are isoparaffins and most generally contain 4 to 12 carbon atoms per molecule and preferably 4 to 6 carbon atoms. Examples of suitable isoparaffins include isobutane, isopentane, 2-methylpentane, 3-methylpentane, 2-methylhexane, 3-ethylhexane, 2,3-dimethylpentane and similar isooctanes, isononanes, isodecanes, isoundecanes and isododecanes. As previously stated, the most frequently used isoparaffin is isobutane. The aromatic hydrocarbons which can be alkylated include benzene, naphthalene and derivatives and homologs thereof.

The olefins employed are usually mono-olefins of 3 to 12 carbon atoms, however, olefins containing 2 or more double bonds such as 1,3-butadiene are operable. Examples of these preferred mono-olefins include propylene, butene-1 and butene-2, pentenes, hexenes, heptenes, octenes, nonenes, dodecenes, etc. Usually the olefin will be a normal olefin, however isomers are operable, e.g. isobutene. As pointed out above the most generally used olefins are butylene, particularly butene-1 and butene-2.

This invention is not in alkylation, such being well known in the art, but is in a process for removing organic fluorides from the alkylate and therefore no further discussion of alkylation is necessary here.

As has been indicated, this invention is especially useful with alkylate containing a high percentage of n-paraffins which cause substantially complete vaporization of the alkylate mixture when it is heated to the decomposition temperature of the organic fluorides. This amount will vary with different hydrocarbons, but is readily ascertainable by those skilled in the art. In the case of n-butane, amounts of 10% or more are troublesome.

This invention will be described in conjunction with the attached drawing which is a block flow diagram of a preferred embodiment of this invention.

Referring to the drawing, a hydrocarbon mixture comprising alkylate, isobutane, normal butane and organic fluorides enters the deisobutanizer 1 via conduit 2. This deisobutanizer is operated so that the components boiling in the isobutane range and lower pass overhead via conduit 3. The normal butane, alkylate and organic fluorides pass via conduit 4, pump 5 and heat exchanger 6 to furnace or reboiler 7. Flow recorder 8 is operably installed to detect the flow in conduit 4. The material passing through furnace 7 on this pass is heated to the desired temperature, 302° F., to control the reboil temperature in the kettle of vessel 1. This heated material is split sending a major portion via conduit 10 back to the kettle of vessel 1 and a minor portion is returned to furnace 7 via conduit 11. Temperature controller 12 and valve 13 are operably installed to maintain the desired flow in conduit 10. The minor portion of the once heated material passes via conduit 11 back to furnace 7 where it is heated to at least 400° F. This 400° F. stream passes via conduit 14, valve 15, heat exchanger 6 and/or conduit 16 to separator 17. The material is cooled via exchanger 6 to condense the normal butane and higher boiling components. Valve 15 is controlled by means of liquid level controller 18 on the kettle level of vessel 1. Temperature recorder controller 19 and valve 20 are operably installed to control the temperature of the material passing to separator 17 by controlling the amount of material by passing exchanger 6. Gases, including HF released by heating the product in conduit 11 to 400° F., pass overhead from separator 17 via conduit 21 to vessel 1 where they pass overhead with the isobutane via conduit 3. Pressure controller 22 is operably installed to detect the pressure in vessel 17 and is connected to valve 23, in conduit 21, to control the pressure in vessel 17. Alkylate and normal butane, now free of fluorides are removed from separator 17 via conduit 24. Liquid level controller 25 is operably connected to valve 26 in conduit 24, to maintain the desired liquid level in vessel 17. Furnace 7 is heated via means of heat supply (fuel) from conduit 27. Flow recorder controller 28 is operably connected to valve 29 in conduit 27, to maintain the fuel supply at the desired rate. Temperature controller 30 is operably connected to flow recorder controller 28 to reset the flow recorder as required to maintain the desired temperature in the furnace effluent in conduit 10.

In the operation of this system, assume that the alkylate from conduit 2 changes in composition so that a larger percent is vaporized, and the liquid level as determined by controller 18 begins to fall. Controller 18 causes valve 15 to close, thereby sending less material to product. The temperature controller 12 is then activated by decreasing temperature in vessel 1 sending more material to the kettle. Since less material is being withdrawn from vessel 1, the temperature sensed by controller 30 tends to rise. Temperature recorder 30 senses this increase in temperature and reduces the flow of fuel to furnace 7. Since less material is passing valve 15, the temperature of the stream passing furnace 7 via conduit 11 initially rises and the temperature of the stream on the outlet side of exchanger 6 is increased and thereby increasing the temperature detected via controller 19. Controller 19 goes into action directing a larger part of the stream through the exchanger 6. Since the gas flow to furnace 7 is reduced, this temperature will drop back some and again controller 19 will adjust the flow of fluid through exchanger 6 and by-pass 16. Since less total flow of product passes to separator 17, liquid level controller 25 is activated to reduce the withdrawal rate from said vessel and pressure recorder controller 22 is activated to reduce the gas flow back to the deisobutanizer. The system is then adjusted to the new condition. If the feed composition changes to increase the product rate, the various controls operate in the opposite direction.

A preferred method of carrying out the process of this invention has been described. Those skilled in the art will see many modifications and will supply valves, pumps etc. as required. Modifications which can be made include separate furnaces for heating the reboil stream and the product stream. For example conduit 11 can pass to a separate furnace or conduit 11 can be installed in conduit 4 prior to furnace 7 and pass to a separate furnace. The hot, 400° F., stream can be condensed by other heat exchange medium, e.g. cold water or some other stream that needs heat. The overhead from separator 17 can be passed to other processing directly, if desired. Many other modifications can be made if desired.

*Specific embodiment*

To further describe this invention and to illustrate the effectiveness of the method, a typical process is described. It should be understood that the operating conditions given are illustrative only and should not be considered limiting except as by the general description above.

Referring to the figure, column 1 operates at 130 p.s.i.a. and 197° F. bottom temperature. The bottoms from column 1 passes to furnace 7 via conduit 4 at a rate of 287,660 pounds per hour. All pounds hereafter refer to pounds per hour. This stream comprises 7,430 pounds isobutane, 151,400 pounds normal butane, 17,500 pounds isopentane, 98,700 pounds light alkylate, 12,630 pounds heavy alkylate and includes 0.05 weight percent organic fluorides. This stream is heated to 231° F. in heat exchanger 6 and is pressurized to 325 p.s.i. in pump 5.

The material leaving furnace 7 is at a temperature of 302° F. and is split into streams 10 and 11. The major portion, 247,790 pounds comprising 6,397 pounds isobutane, 130,436 pounds normal butane, 15,077 pounds isopentane, 85,000 pounds light alkylate, and 10,874 pounds heavy alkylate and still containing 0.05 weight percent organic fluorides, is returned via conduit 10 to deisobutanizer 1. Approximately 50 mol percent of this stream is vapor. The minor portion of the material from furnace, 39,870 pounds comprising 1,032.6 pounds isobutane, 20,964.6 pounds normal butane, 2,422.6 pounds isopentane, 13,694.4 pounds light alkylate and 1,756 pounds heavy alkylate, is returned via conduit 11 to the furnace where it is heated to 425° F. This material is cooled in heat exchanger 6 and is passed to separator 17.

Separator 17 operates at 250 p.s.i.a. and 271° F. top temperature. The overhead stream, 6,904.2 pounds comprising 301.6 pounds isobutane, 5,434.6 pounds normal butane, 417.6 pounds isopentane, 734.4 pounds light alkylate, 16 pounds heavy alkylate and including a small amount of HF resulting from decomposition of organic fluorides, returns to deisobutanizer 1 via conduit 21. The bottoms from separator 17, 32,966 pounds comprising 731 pounds isobutane, 15,530 pounds normal butane, 2,005 pounds isobutane, 12,960 pounds light alkylate, 1,740 pounds heavy alkylate and including 0.0025 weight percent organic fluoride, passes via conduit 24 to a debutanizing column not shown.

From the above example, it can be seen that the fluoride content is reduced from 0.05 to 0.0025 weight percent organic fluorides when operating according to this invention. When operating by conventional methods of blending bottoms and reboiler heater material, the product would have about 0.005 weight percent organic fluorides.

We claim:

1. In a process wherein an isoparaffin is alkylated with an olefin in the presence of a fluorine containing catalyst and the alkylate is separated from the major portion of unreacted isoparaffin in a fractionation column containing a reboiler section, the improvement comprising withdrawing column bottoms comprising alkylate and organic fluorides from said reboiler section, heating the withdrawn material, dividing the withdrawn material into two portions, returning all of one of said portions comprising alkylate and organic fluorides sufficient to maintain a desired temperature in said fractionation column to said column, heating the second portion of the withdrawn material to at least 400° F., thereby decomposing organic fluorides and forming hydrogen fluoride, separating said hydrogen fluoride from alkylate and recovering last said alkylate as product.

2. A process of defluorinating hydrocarbons containing organic fluorides which comprises heating said hydrocarbons in liquid phase to a temperature at which HF and low boiling hydrocarbons are vaporized, withdrawing liquid high boiling hydrocarbons containing organic fluorides from the heating step, dividing said withdrawn hydrocarbons into two portions, heating all of one of said portions of the withdrawn hydrocarbon containing organic fluorides to a temperature below 400° F. to supply heat for first said heating, heating the second portion of the withdrawn hydrocarbon to at least 400° F. thereby decomposing organic fluorides forming HF, and separating said HF from the last said withdrawn hydrocarbon.

3. In a process wherein isobutane is alkylated with olefin in the presence of hydrogen fluoride and unreacted isobutane and HF is separated in a fractionation zone from alkylate containing organic fluorides, the improvement comprising withdrawing alkylate containing organic fluorides from said fractionation zone, heating the withdrawn material to a temperature below 400° F., passing sufficient heated material comprised of alkylated and organic fluorides to said fractionation zone to maintain the desired operating temperature therein, heating the remaining first heated material to a temperature of at least 400° F., thereby decomposing organic fluorides and forming HF, cooling the last heated material to condense alkylate, passing said alkylate and said HF to a separation zone, withdrawing condensed alkylate, passing HF and uncondensed material to said fractionation zone and withdrawing vapors including HF from said fractionation zone.

4. The process of claim 3 wherein the alkylation is in the presence of normal butane and normal butane is withdrawn with alkylate from said fractionation zone.

5. The process of claim 4 wherein said butane comprises at least 10% of the material withdrawn from said fractionation zone.

6. The process of claim 5 wherein said butane comprises 10 to 60 weight percent of the material withdrawn from said fractionation zone.

7. A product recovery system for hydrogen fluoride alkylation comprising in combination a fractionation column including a kettle portion, an external reboiler for said column, a vapor-liquid separator, a first conduit means for passing fluid from said kettle portion through said reboiler and to said fractionation column, a second conduit means for passing fluid from said first conduit means downstream from said reboiler back through said reboiler to said separator, means for withdrawing liquid product from said separator and means for supplying heat to said reboiler.

8. A product recovery system for hydrogen fluoride alkylation comprising in combination a fractionation column including a kettle portion, an external reboiler for said column, a vapor-liquid separator, a first conduit means for passing fluid from said kettle portion through said reboiler and to said fractionation column, a second conduit means for passing fluid from said first conduit means downstream from said reboiler back through said reboiler to said separator, a third conduit means for passing vapors from said separator to said fractionation column, means for withdrawing liquid product from said separator and means for supplying heat to said reboiler.

9. The recovery system of claim 8 wherein said second conduit means passes through a heat exchange means downstream from second pass through said reboiler, said first conduit means passing through said heat exchange means upstream of said reboiler and in heat exchange relationship with said second conduit means.

10. A control system for the system of claim 9 comprising in combination a means for detecting the liquid level in said kettle portion of said fractionation column, means for proportioning the flow through the said first and second conduit means responsive to said means for detecting said liquid level, said first conduit means returning fluid to said column to maintain a substantially constant liquid level; means for withdrawing fluid from said kettle portion through said first conduit means at a substantially constant rate; means for maintaining temperature in said first conduit means downstream of said reboiler substantially constant; means for detecting temperature in said second conduit means downstream of said heat exchange means; fourth conduit means communicating with said second conduit means and bypassing said heat exchange means; means responsive to said means for detecting temperature in said second conduit means to regulate the flow through said fourth conduit means; means for detecting liquid level in said separator, means for withdrawing liquid through a conduit means from said separator responsive to said means for detecting liquid level therein; means for detecting temperature in said fractionation column and means for regulating heat input to said fractionation column responsive to said means for detecting temperature, so as to maintain temperature in said fractionation column substantially constant.

References Cited in the file of this patent

UNITED STATES PATENTS

| | | |
|---|---|---|
| 2,729,588 | Hannah | Jan. 3, 1956 |
| 2,759,032 | Dixon | Aug. 14, 1956 |